United States Patent
Furukawa et al.

(10) Patent No.: US 8,986,813 B2
(45) Date of Patent: Mar. 24, 2015

(54) SLIDING NOZZLE PLATE

(75) Inventors: Kento Furukawa, Fukuoka (JP); Yuji Nakamoto, Fukuoka (JP); Shoji Kikukawa, Fukuoka (JP); Zenta Oomaru, Fukuoka (JP)

(73) Assignee: Krosakiharima Corporation, Fukuoka (JP)

( * ) Notice: Subject to any disclaimer, the term of this patent is extended or adjusted under 35 U.S.C. 154(b) by 437 days.

(21) Appl. No.: 13/308,610

(22) Filed: Dec. 1, 2011

(65) Prior Publication Data

US 2012/0141740 A1 Jun. 7, 2012

(30) Foreign Application Priority Data

Dec. 3, 2010 (JP) .................. 2010-270405
Feb. 2, 2011 (JP) .................. 2011-020744

(51) Int. Cl.
| | | |
|---|---|---|
| B32B 3/02 | (2006.01) | |
| C04B 35/103 | (2006.01) | |
| B22D 41/32 | (2006.01) | |
| C04B 35/01 | (2006.01) | |
| C04B 35/043 | (2006.01) | |
| C22C 1/05 | (2006.01) | |
| C22C 29/12 | (2006.01) | |

(52) U.S. Cl.
CPC .............. *C04B 35/103* (2013.01); *B22D 41/32* (2013.01); *C04B 35/013* (2013.01); *C04B 35/043* (2013.01); *C04B 2235/402* (2013.01); *C04B 2235/422* (2013.01); *C04B 2235/428* (2013.01); *C04B 2235/94* (2013.01); *C04B 2235/95* (2013.01); *C04B 2235/96* (2013.01); *C04B 2235/9607* (2013.01); *C22C 1/051* (2013.01); *C22C 29/12* (2013.01)

USPC .......................................... 428/157; 428/220

(58) Field of Classification Search
CPC .......................................... B22D 41/22–41/36
USPC .................................. 164/142; 428/157, 220
See application file for complete search history.

(56) References Cited

U.S. PATENT DOCUMENTS 4,179,046 A * 12/1979 Jeschke et al. ................ 222/600
2004/0261978 A1 * 12/2004 Zhan et al. ............... 165/104.11

FOREIGN PATENT DOCUMENTS

JP 57-027968 A 2/1982
JP 2004141899 A * 5/2004

OTHER PUBLICATIONS

Kiyota et al. JPO translation of JP2004-141899, attached.*

* cited by examiner

*Primary Examiner* — Aaron Austin
*Assistant Examiner* — Laura Figg
(74) *Attorney, Agent, or Firm* — Paul D. Bianco; Martin Fleit; Fleit Gibbons Gutman Bongini & Bianco PL

(57) ABSTRACT

The present invention provides an SN plate capable of being formed in a large size while using a highly corrosion resistant and highly thermally expansible refractory product. In the SN plate of the present invention, a specific refractory member $1a$ having a thermal expansion rate as measured at 1500° C. of 1.15 to 2.50% due to addition of aluminum for improving corrosion resistance is arranged as a part of the SN plate to cover at least a practically critical region of the SN plate. A thickness of the specific refractory member is set in a range of 15 to 25 mm. A portion of the SN plate other than the specific refractory member is made up of an unburned or burned refractory product consisting primarily of an alumina-carbon composite.

16 Claims, 4 Drawing Sheets

(a)

(b)

(c)

1a

1a

1a

1a

1a

SLIDING NOZZLE PLATE

TECHNICAL FIELD

The present invention relates to a sliding nozzle plate (hereinafter referred to as "SN plate") which is a plate-shaped brick for use in a sliding nozzle device (hereinafter referred to as "SN device") designed to control a flow rate of molten steel.

BACKGROUND ART

In production of steel, an SN device is used as a means to control a flow rate of molten steel to be discharged from a molten metal vessel, such as a ladle or a tundish. The SN device comprises two or three SN plates each made of a refractory material and formed with a nozzle hole. The SN plates are assembled such that they are slidably moved with respect to each other under a constrained condition while being superimposed on each other under a surface pressure, so as to adjust an opening between the nozzle holes to control a flow rate of molten steel.

Therefore, an SN plate is required to have spalling resistance against thermal stress during casting, as well as corrosion resistance against slag, inclusions, etc., in molten steel.

Heretofore, as means to improve corrosion resistance of an SN plate, it has been known to add a metal, such as aluminum or silicon (see, for example, Patent Document 1).

LIST OF PRIOR ART DOCUMENTS

Patent Documents

Patent Document 1: JP 57-027968A

SUMMARY OF THE INVENTION

Problem to be Solved by the Invention

However, if a metal for improving corrosion resistance is added in a large amount, an obtained SN plate will have high thermal expansibility, which leads to deterioration in spalling resistance. Particularly, in a large-sized SN plate in which a hole diameter of a nozzle hole for allowing molten steel to pass therethrough is greater than 50 mm (e.g., dimension A (length)=550 mm, dimension B (width)=250 mm, dimension C (thickness)=45 mm), the problem of deterioration in spalling resistance becomes prominent. More specifically, if such a large-sized SN plate has high thermal expansibility, a practical use thereof becomes difficult, because the high thermal expansibility is highly likely to cause a burning crack (crack occurring during burning), and, even if no burning crack occurs, an initial crack (crack caused by spalling due to passing of molten steel) is highly likely to occur.

It is therefore an object of the present invention to provide an SN plate capable of being formed in a large size while using a highly corrosion resistant and highly thermally expansible refractory product.

Means for Solving the Problem

The present invention provides a sliding nozzle plate which comprises a specific refractory member having a thermal expansion rate as measured at 1500° C. of 1.15 to 2.50% due to addition of metallic aluminum, wherein the specific refractory member is arranged as a part of the sliding nozzle plate to cover at least a practically critical region of the sliding nozzle plate, and fitted in a refractory base member making up a portion of the sliding nozzle plate other than the specific refractory member, through mortar, and wherein a thickness of the specific refractory member is in a range of 15 to 25 mm.

As used here, the term "practically critical region" conceptually means a partial region of a sliding surface (operating surface) of an SN plate which is particularly required to have corrosion resistance. This definition will be more specifically described later.

Effect of the Invention

In the present invention, a specific refractory member having a high thermal expansion rate as measured at 1500° C. of 1.15 to 2.50% due to addition of a metal such as aluminum for improving corrosion resistance of an SN plate is arranged to cover the practically critical region. However, if an SN plate is entirely made using the same composition as that of the specific refractory member, an influence of the deterioration in spalling resistance will become prominent. Thus, in the present invention, the specific refractory member is arranged as a "part" of the SN plate to cover at least the practically critical region. More specifically, in the present invention, the specific refractory member is arranged in, or in and around, the practically critical region particularly required to have corrosion resistance, and a portion of the SN plate other than the specific refractory member is made of a suitable composition different from that of the specific refractory member, to minimize a portion made up of the specific refractory member with high thermal expansibility. This makes it possible to form a large-sized SN plate while using the specific refractory member.

BRIEF DESCRIPTION OF THE DRAWINGS

FIGS. 3(a) and 3(b) illustrate an SN plate used in Example, wherein FIG. 3(a) is a bottom view illustrating a sliding surface, and FIG. 3(b) is a sectional view.

DESCRIPTION OF EMBODIMENTS

In the present invention, a specific refractory member having a thermal expansion rate as measured at 1500° C. of 1.15 to 2.50% as a result of addition of a metal excellent in a corrosion resistance-imparting effect, such as aluminum, is arranged as a part of an SN plate to cover at least a practically critical region of the SN plate. A portion (base member) of the SN plate other than the specific refractory member may be made up, for example, of an unburned or burned refractory product consisting primarily of an alumina-carbon composite, which are commonly used for SN plates.

Figure 1:
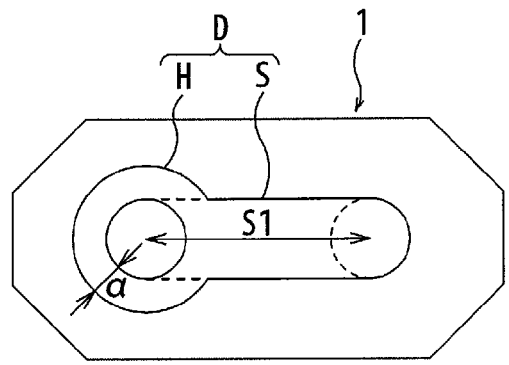
FIG. 1 is a schematic diagram illustrating a practically critical region of an SN plate according to one embodiment of the present invention.

As used here, the term "practically critical region" means a partial region of a sliding surface of an SN plate particularly required to have corrosion resistance. More specifically, as illustrated in FIG. 1, in a sliding surface of an SN plate 1 according to one embodiment of the present invention, the practically critical region corresponds to a total D of a stroke region S (a region to be subjected to direct contact with molten steel during actual casting operation) and a nozzle hole-surrounding region H. In FIG. 1, S1 indicates a distance between respective center positions of a nozzle hole at fully opened and fully closed positions, and a indicates a width of the nozzle hole-surrounding region H. The distance S1 is determined by specifications of an SN device. The width α is a so-called safe or margin dimension, and preferably set in the range of 10 to 30 mm. If the width α is less than 10 mm, the base member is likely to exposed to molten steel due to chipping of a edge of the nozzle hole. Moreover, such a structure can be hardly produced. Even if it can be successfully produced, process yield will be significantly deteriorated. On the other hand, if the width α is greater than 30 mm, an influence of the deterioration in spalling resistance will become prominent.

Figure 2:
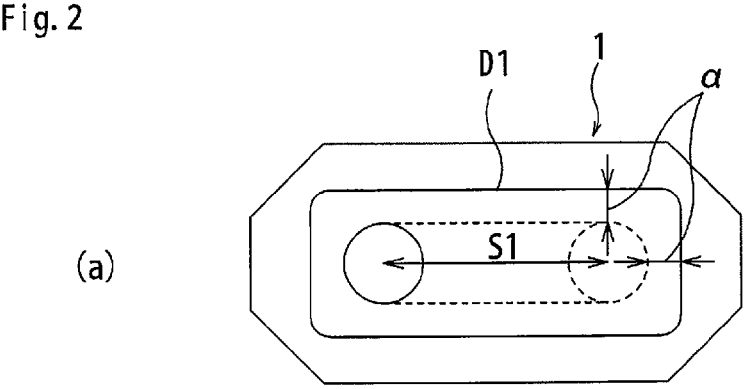
FIGS. 2(a) to 2(c) are schematic diagram illustrating various examples of modification of a specific refractory member-arranging region in the SN plate.
Figure 2:
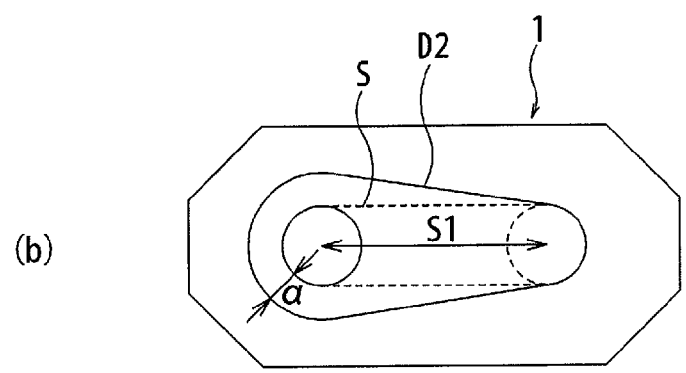
Figure 2:
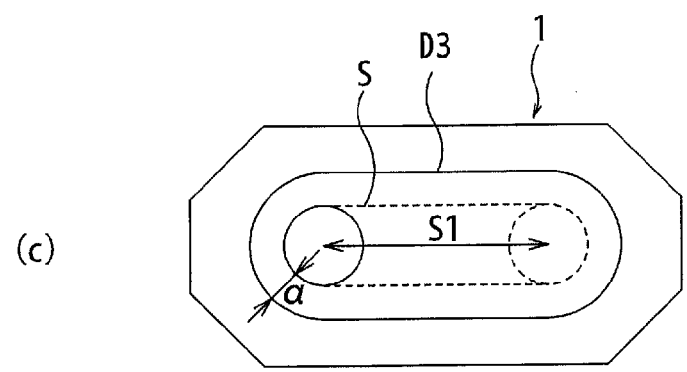

In the present invention, the specific refractory member is arranged as a part of the SN plate to cover at least the practically critical region D illustrated in FIG. 1. For example, the specific refractory member may be arranged only in the practically critical region D illustrated in FIG. 1. Alternatively, as illustrated in FIGS. 2(a), 2(b) and 2(c), the specific refractory member may be arranged in one of a region D1, a region D2 and a region D3 each covering the practically critical region D illustrated in FIG. 1.

The specific refractory member for use in the SN plate of the present invention is made of a composition containing a raw material excellent in a corrosion resistance-imparting effect. For example, the raw material excellent in a corrosion resistance-imparting effect includes metallic aluminum, magnesium oxide and chromium oxide. Such a raw material leads to an increase in thermal expansibility of the SN plate, which has an adverse impact on spalling resistance. For example, when metallic aluminum is added to an alumina-carbon based SN plate material in an amount of 5 mass %, corrosion resistance is improved, whereas a thermal expansion rate is increased to 1.15%, which is liable to crack during use of an obtained refractory product due to its high thermal expansibility. The raw material excellent in a corrosion resistance-imparting effect brings out the corrosion resistance-imparting effect when it is added in an amount corresponding to a thermal expansion rate of up to 2.50%. However, even if it is added in an amount corresponding to a thermal expansion rate of greater than 2.50%, further corrosion resistance-imparting effect cannot be expected. In either case, although the SN plate having a thermal expansion rate of 1.15 to 2.50% becomes highly corrosion resistant, it cannot be used as an SN plate, particularly a large-sized SN plate, due to a problem of burning crack during production, or crack (initial crack) caused by spalling during use. The present invention is intended to improve the above problem by limiting the use of the refractory product having a thermal expansion rate as measured at 1500° C. of 1.15 to 2.50%, i.e., the specific refractory member, to a part of an SN plate covering at least the practically critical region.

A thickness of the specific refractory member is set in the range of 15 to 25 mm. If the thickness of the specific refractory member is less than 15 mm or greater than 25 mm, a maximum stress occurring in an edge of a nozzle hole will be increased (see an aftermentioned FEM calculation result), which raises concerns about a problem of chipping of the edge or crack.

Preferably, an outer peripheral edge of a bottom portion of the specific refractory member is cut. The cutting of the outer peripheral edge of the bottom portion of the specific refractory member makes it possible to improve efficiency of an operation for setting the specific refractory member to a region covering the practically critical region. Preferably, the outer peripheral edge of the bottom portion of the specific refractory member is cut with R5 or more, or cut with C5 or more, to significantly bring out the above advantageous effect.

Example 1

An SN plate as an inventive sample was produced by arranging the specific refractory member as a part of the SN plate to cover a practically critical region of the SN plate. Further, an SN plate as a comparative sample was produced by forming the entire SN plate using the same composition as that of the specific refractory member in the inventive sample.

Example 1-1

Figure 3:
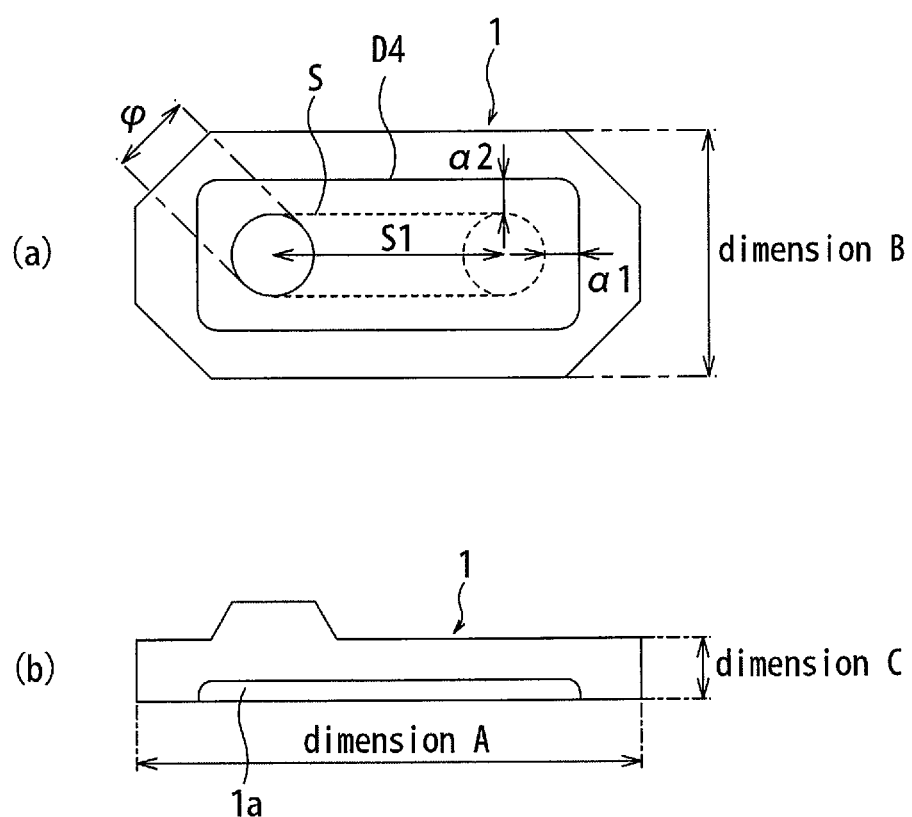

The produced SN plate had a shape as illustrated in FIGS. 3(a) and 3(b). In Example 1-1, the dimension A (length), the dimension B (width) and the dimension C (thickness) were set to 500 mm, 250 mm and 40 mm, respectively. In an inventive sample, under the condition that a distance S1 between respective center positions of a nozzle hole at fully opened and fully closed positions, a hole diameter φ of the nozzle hole, a margin dimension α1 in a sliding direction of the SN plate and a margin dimension α2 in a direction perpendicular to the sliding direction of the SN plate were set, respectively, to 250 mm, 100 mm, 10 mm and 25 mm, a specific refractory member 1a was arranged in a region D4 defined by a length in the sliding direction of the SN plate (S1+φ+2×α1) of 370 mm and a length in the direction perpendicular to the sliding direction (φ+2×α2) of 150 mm, with a thickness of 20 mm The region D4 covers the practically critical region D described in connection with FIG. 1.

The specific refractory member was prepared by subjecting a composition consisting of 92 mass % of alumina powder, 3 mass % of carbon powder and 5 mass % of metallic aluminum powder to mixing, drying and burning. The specific refractory member had a thermal expansion rate as measured at 1500° C. of 1.15%, and an acoustic velocity-based elastic modulus of 80 GPa (Composition A in Tables 3 and 4).

In the inventive sample, the specific refractory member was limitedly used in the region D4, and an alumina-carbon based refractory product prepared by subjecting a composition consisting of 95 mass % of alumina powder, 3 mass % of carbon powder and 3 mass % of metallic silicon powder to mixing, drying and burning was used in a region other than the region D4 (i.e., used as a refractory base member). Specifically, the SN plate as the inventive sample was produced by preparing a specific refractory member having a shape corresponding to the region D4, and fitting the specific refractory member into the refractory base member through mortar. On the other hand, in a comparative sample, the above composition of the specific refractory member was used to form the entirety of the SN plate illustrated in FIGS. 3(a) and 3(b). Specifically, in the comparative sample, the above composition of the specific refractory member was formed into a shaped body corresponding to the entire SN plate, and the shaped body was subjected to drying and burning.

As a result of the production, the inventive sample was obtained as a satisfactory SN plate without occurrence of crack. On the other hand, the comparative sample had visually observable cracks, and it was evaluated that the comparative sample cannot be practically used.

Example 1-2

The specific refractory member was prepared by subjecting a composition consisting of 87 mass % of alumina powder, 3 mass % of carbon powder and 10 mass % of metallic aluminum powder to mixing, drying and burning, and an SN plate as an inventive sample was produced in the same manner as that in Example 1-1. The specific refractory member in the inventive sample had a thermal expansion rate as measured at 1500° C. of 1.33%, and an acoustic velocity-based elastic modulus of 120 GPa (Composition C in Tables 3 and 4). On the other hand, in a comparative sample, the above composition of the specific refractory member was used to form the entirety of the SN plate illustrated in FIGS. 3(a) and 3(b).

As a result of the production, in the inventive sample formed by limitedly using the specific refractory member in the region D4, although fine cracks were observed in the specific refractory member, any crack connecting to a refractory base member surrounding the specific refractory member was not observed, and it was therefore evaluated that the fine cracks are not particularly problematic in terms of practical use. On the other hand, the comparative sample formed by using the composition of the specific refractory member in the entirety of the SN plate had a large number of cracks, and it was therefore evaluated that the comparative sample cannot be practically used.

Example 1-3

The specific refractory member was prepared by subjecting a composition consisting of 92 mass % of magnesia powder, 3 mass % of carbon powder and 5 mass % of metallic aluminum powder to mixing, drying and burning, and an SN plate as an inventive sample was produced in the same manner as that in Example 1-1. The specific refractory member in the inventive sample had a thermal expansion rate as measured at 1500° C. of 2.50%, and an acoustic velocity-based elastic modulus of 80 GPa (Composition D in Tables 3 and 4). On the other hand, in a comparative sample, the above composition of the specific refractory member was used to form the entirety of the SN plate illustrated in FIGS. 3(a) and 3(b).

As a result of the production, in the inventive sample formed by limitedly using the specific refractory member in the region D4, although fine cracks were observed in the specific refractory member, any crack connecting to a refractory base member surrounding the specific refractory member was not observed, and it was therefore evaluated that the fine cracks are not particularly problematic in terms of practical use. On the other hand, the comparative sample formed by using the composition of the specific refractory member in the entirety of the SN plate had a large number of cracks, and it was therefore evaluated that the comparative sample cannot be practically used.

As above, it was ascertained that, when the specific refractory member is limitedly used to cover at least the practically critical region according to the present invention, a large-sized SN plate can be produced without crack causing practical use problems.

In the above inventive samples, a burned refractory product is used as the refractory base member to be used in a region other than the region D4. Alternatively, an unburned refractory product may be used as the refractory base member.

Example 2

A relationship between a thickness of the specific refractory member arranged in the practically critical region and a maximum stress occurring in an edge of the nozzle hole was calculated by FEM.

The FEM calculation was performed under the following conditions.

Figure 4:
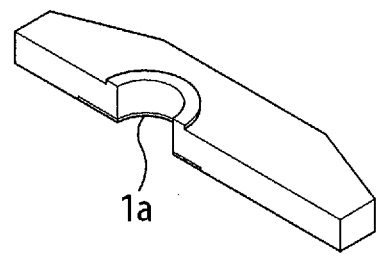
FIG. 4 illustrates various CAD models corresponding to respective FEM-calculated models.
Figure 4:
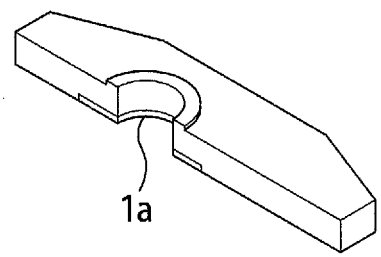
Figure 4:
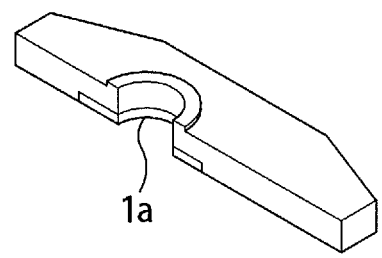
Figure 4:
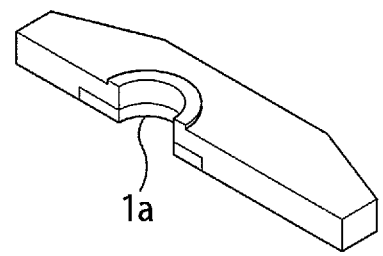
Figure 4:
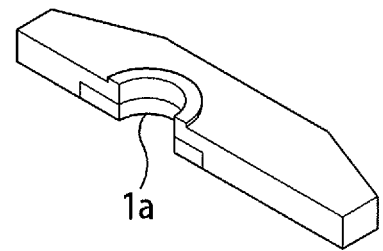

<Software Used>
CosmosWorks 2007 MSC. Marc 2008
<Modeling>
A ½-size CAD model was formed. Based on the CAD model, an FEM model was formed using 4-node quadrangle elements. A reference length for mesh division was set to 5 mm.
<Thermal Analysis>
Initial temperature:
  Nozzle hole (opening: 50%): 1550° C., $1.16 \times 10^{-3}$ W/mm²·K
  Outer peripheral side: 25° C., $1.16 \times 10^{-3}$ W/mm²·K
Time step: 1 second/step, for 20 seconds
<Stress Analysis>
Initial temperature: 25° C.
Giving displacement constraint in consideration of symmetry
Giving constraint in Y-direction for suppressing rotation
Giving displacement constraint in X-direction
Calculating thermal stress from thermal analysis result Table 1 illustrates a model number and a condition, and FIG. 4 illustrates CAD models corresponding to models 1 to 5 illustrated in Table 1. As illustrated in Table 1 and FIG. 4, in the models 1 to 5, the thickness of the specific refractory member 1a to be arranged in a region covering the practically critical region of the SN plate (the region D4 in FIGS. 3(a) and 3(b)) was changed in the range of 5 to 25 mm. The model 6 is an example in which no specific refractory member is arranged.

TABLE 1

| | Thickness (mm) |
|---|---|
| Model 1 | 5 |
| Model 2 | 10 |
| Model 3 | 15 |
| Model 4 | 20 |
| Model 5 | 25 |
| Model 6 | 0 |

The FEM calculation was performed under the condition that a heating region is set to the nozzle hole, and an outer periphery of the nozzle plate is cooled. Further, physical property values used in the FEM calculation was as illustrated in Table 2.

TABLE 2

| | | Base Member | Specific refractory member | mortar |
|---|---|---|---|---|
| Thermal conductivity | W/mm²·K | $8.00 \times 10^{-3}$ | $8.00 \times 10^{-3}$ | 0.0015 |
| Specific heat | J/kg·K | 840.0 | 840.0 | 1000 |
| Bulk specific gravity | g/cm³ | 3.25 | 3.465 | 2 |
| Static elastic modulus | GPa | 21.3 | 40 | 0.1 |

TABLE 2-continued

| | | Base Member | Specific refractory member | mortar |
|---|---|---|---|---|
| Poisson ratio | — | 0.2 | 0.2 | 0.2 |
| Thermal expansion ratio | % | 0.968 | 1.15 | |
| Thermal expansion coefficient | 1/° C. | $6.563 \times 10^{-6}$ | $7.797 \times 10^{-6}$ | $7.00 \times 10^{-6}$ |

Figure 5:
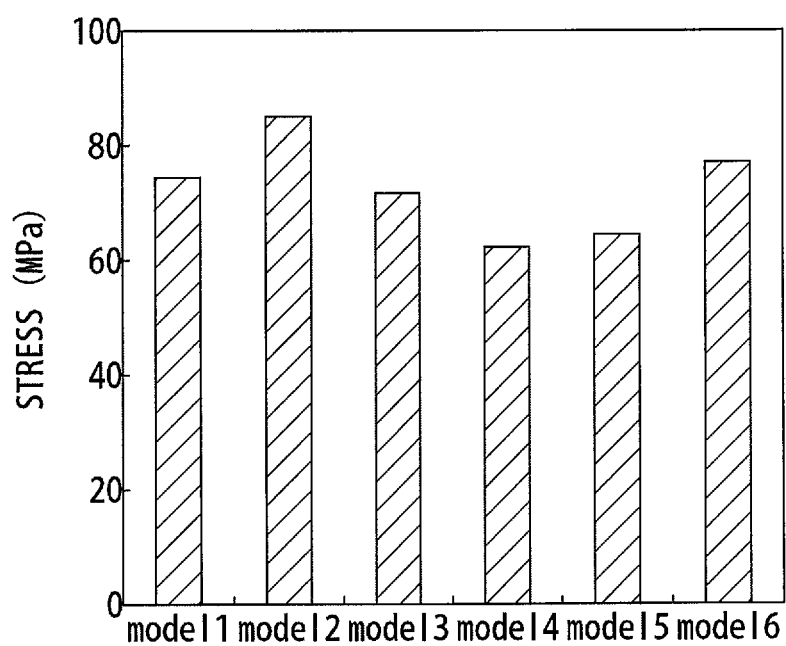
FIG. 5 is a graph illustrating an FEM calculation result of a maximum stress occurring at an edge of a nozzle hole of an SN plate.

Under the above conditions, a maximum stress occurring in an edge of the nozzle hole (edge on a side of the SN plate where the specific refractory member is arranged) was calculated by FEM. FIG. 5 illustrates the FEM calculation result. As seen in FIG. 5, when the thickness of the specific refractory member is in the range of 15 to 25 mm, a decrease in stress is observed.

Example 3

A relationship between a composition of the specific refractory member and corrosion resistance was checked. Table 3 illustrates compositions used.

TABLE 3

| | Component (mass %) | | | |
|---|---|---|---|---|
| | Alumina Powder | Magnesia Powder | Carbon Powder | Metallic Al Powder |
| Composition A | 92 | | 3 | 5 |
| Composition B | 90 | | 3 | 7 |
| Composition C | 87 | | 3 | 10 |
| Composition D | | 92 | 3 | 5 |

As for each of the compositions A to C, components thereof were subjected to mixing, drying and burning in non-oxidizing atmosphere, to form a burned body. As for the composition D, components thereof were subjected to mixing and drying, to form an unburned body. Then, a sample made of each of the compositions was lined on a crucible in a high-frequency induction furnace, and molten steel was put in the crucible. After adding mill scale, the molten steel was stirred for 2 hours. After the test, corrosion resistance was evaluated based on a wear speed of each sample. For each of the samples made of the compositions, an acoustic velocity-based elastic modulus and a thermal expansion rate as measured at 1500° C. were evaluated. The acoustic velocity-based elastic modulus was evaluated by the elastic modulus testing method defined in JIS R 1602, and the thermal expansion rate was evaluated by the thermal expansion testing method defined in JIS R 2207-1. Table 4 illustrates the evaluation result.

TABLE 4

| | Composition A | Composition B | Composition C | Composition D |
|---|---|---|---|---|
| Index of corrosion resistance | 100 | 93 | 85 | 30 |
| Acoustic velocity-based elastic modulus (MPa) | 90 | 100 | 120 | 80 |
| Thermal expansion rate (%) | 1.15 | 1.25 | 1.33 | 2.50 |

In Table 4, corrosion resistance of each of four samples made of the respective compositions was represented by an index determined on the assumption that a wear speed of the sample made of the composition A is 100, wherein a smaller value indicates better corrosion resistance. As seen in Table 4, corrosion resistance tends to be improved as the acoustic velocity-based elastic module becomes higher, which shows that the corrosion resistance is improved by densification of a refractory microstructure along with an increased in elastic modulus.

EXPLANATION OF CODES

1: SN plate
1a: specific refractory member
D: practically critical region
D1 to D4: region covering practically critical region
S: stroke region
H: nozzle hole-surrounding region

What is claimed is:
1. A two-portion sliding nozzle (SN) plate for use in a sliding nozzle device comprising:
   a refractory insert portion, the refractory insert portion having a maximum thermal expansion measured at 1500° C. of 1.15 to 2.50% due to addition of metallic aluminum and a thickness in a range of 15 to 25 mm;
   a refractory base portion, wherein the refractory insert portion is fitted over a sliding surface of the refractory base portion to cover a region of the sliding surface of the sliding nozzle plate most required to have corrosion resistance as compared to other regions of the sliding surface of the sliding nozzle plate; and
   a nozzle hole for allowing molten metal to pass therethough, the nozzle hole having a diameter of greater than 50 mm.
2. The two-portion sliding nozzle plate according to claim 1, further comprising a layer of mortar, the layer of mortar fitting the refractory insert portion over the sliding surface of the refractory base portion and connecting the refractory insert portion to the refractory base portion.
3. The two-portion sliding nozzle plate according to claim 1, wherein the refractory base portion is composed of an unburned or a burned refractory product comprising an alumina-carbon composite.
4. The two-portion sliding nozzle plate according to claim 1, wherein an outer peripheral edge of a bottom portion of the refractory insert portion is cut.
5. The two-portion sliding nozzle plate according to claim 4, wherein the outer peripheral edge of the bottom portion of the refractory insert portion is cut with a generic machining notation of R5 (C5).
6. A two-portion sliding nozzle (SN) plate for use in a sliding nozzle device comprising:

a refractory insert portion, the refractory insert portion having a maximum thermal expansion measured at 1500° C. of 1.15 to 2.50% due to addition of metallic aluminum and a thickness in a range of 15 to 25 mm;
a refractory base portion,
a layer of mortar, wherein the refractory insert portion is fitted over a sliding surface of the refractory base portion and connected to the refractory base portion by the layer of mortar, the refractory insert portion covering a region of the sliding surface of the sliding nozzle plate most required to have corrosion resistance as compared to other regions of the sliding surface of the sliding nozzle plate; and
a nozzle hole for allowing molten metal to pass therethough, the nozzle hole having a diameter of greater than 50 mm.

7. The two-portion sliding nozzle plate according to claim 6, wherein the refractory base portion is composed of an unburned or a burned refractory product comprising an alumina-carbon composite.

8. The two-portion sliding nozzle plate according to claim 6, wherein an outer peripheral edge of a bottom portion of the refractory insert portion is cut.

9. The two-portion sliding nozzle plate according to claim 8, wherein the outer peripheral edge of the bottom portion of the refractory insert portion is cut with a generic machining notation of R5 (C5).

10. The two-portion sliding nozzle plate according to claim 1, wherein the diameter of the nozzle hole is 100 mm.

11. The two-portion sliding nozzle plate according to claim 6, wherein the diameter of the nozzle hole is 100 mm.

12. A two-portion sliding nozzle (SN) plate for use in a sliding nozzle device comprising:
a refractory insert portion, the refractory insert portion having a maximum thermal expansion measured at 1500° C. of 1.15 to 2.50% due to addition of metallic aluminum and a thickness in a range of 15 to 25 mm;
a refractory base portion having a lower thermal expansibility than the refractory insert portion,
a layer of mortar, wherein the refractory insert portion is fitted over a sliding surface of the refractory base portion and connected to the refractory base portion by the layer of mortar, the refractory insert portion covering a region of the refractory base portion to minimize an area of higher thermal expansibility in the refractory base portion; and
a nozzle hole for allowing molten metal to pass therethough, the nozzle hole having a diameter of greater than 50 mm.

13. The two-portion sliding nozzle plate according to claim 12, wherein the refractory base portion is composed of an unburned or a burned refractory product comprising an alumina-carbon composite.

14. The two-portion sliding nozzle plate according to claim 12, wherein an outer peripheral edge of a bottom portion of the refractory insert portion is cut.

15. The two-portion sliding nozzle plate according to claim 14, wherein the outer peripheral edge of the bottom portion of the refractory insert portion is cut with a generic machining notation of R5 (C5).

16. The two-portion sliding nozzle plate according to claim 12, wherein the diameter of the nozzle hole is 100 mm.

* * * * *